United States Patent
Tseng et al.

(10) Patent No.: US 6,364,697 B1
(45) Date of Patent: Apr. 2, 2002

(54) PALMTOP COMPUTER DOCKING SYSTEM

(75) Inventors: Grace Tseng, Palo Alto; David Christopher, San Francisco; Sean O'Hara, Foster City; Lauren Utigard, Pleasanton; David Northway, San Carlos, all of CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/569,550

(22) Filed: May 12, 2000

(51) Int. Cl.$^7$ .............................................. H01R 13/60
(52) U.S. Cl. ....................................... 439/533; 439/929
(58) Field of Search ........................ 439/152, 52, 638; 361/683, 680, 681, 686; 395/281, 750.02, 300, 893

(56) References Cited

U.S. PATENT DOCUMENTS

| | | | | |
|---|---|---|---|---|
| 3,379,952 A | * | 4/1968 | Tarrson | 439/247 |
| 3,710,224 A | * | 1/1973 | Daniels | 439/929 |
| 4,817,101 A | * | 3/1989 | Wyeth et al. | 372/32 |
| 5,227,953 A | * | 7/1993 | Lindberg | 361/393 |
| 5,540,161 A | * | 7/1996 | Schroeder, Jr. | 112/220 |
| 5,574,804 A | * | 11/1996 | Olschafsie et al. | 382/313 |
| 5,579,489 A | * | 11/1996 | Dornier et al. | 395/281 |
| 5,648,712 A | * | 7/1997 | Hahn | 320/2 |
| 5,668,695 A | * | 9/1997 | Reid | 361/686 |
| 5,825,350 A | * | 10/1998 | Case, Jr. et al. | 345/163 |
| 5,888,087 A | * | 3/1999 | Hanson et al. | 439/374 |
| 5,982,614 A | * | 11/1999 | Reid | 361/686 |
| 6,029,215 A | * | 2/2000 | Watts, Jr. et al. | 710/101 |
| 6,240,426 B1 | * | 5/2001 | Beyda et al. | 707/201 |

* cited by examiner

Primary Examiner—Neil Abrams
Assistant Examiner—J. F. Duverne
(74) Attorney, Agent, or Firm—Wagner Murabito & Hao LLP

(57) ABSTRACT

A method and system for coupling to a palmtop computer that supports both mobile computing and desktop use. A palmtop computer docking system is disclosed that includes a cable assembly and a base. The cable assembly includes a cable dock that is connected to a serial connector via an electrical cable. The cable dock includes a connector receptacle that mates with a corresponding connector on a palmtop computer. The cable assembly is adapted to engage the base so as to produce a fully functional docking cradle. In operation, once the cable assembly is engaged with the base, the serial connector is then coupled to the desired computing device (typically either a portable computer or a full-size computer). The resulting docking cradle facilitates desktop use such as, for example, communication with a full size computer. The cable assembly can be removed from the base and can be used independently of the base for mobile computing.

12 Claims, 17 Drawing Sheets

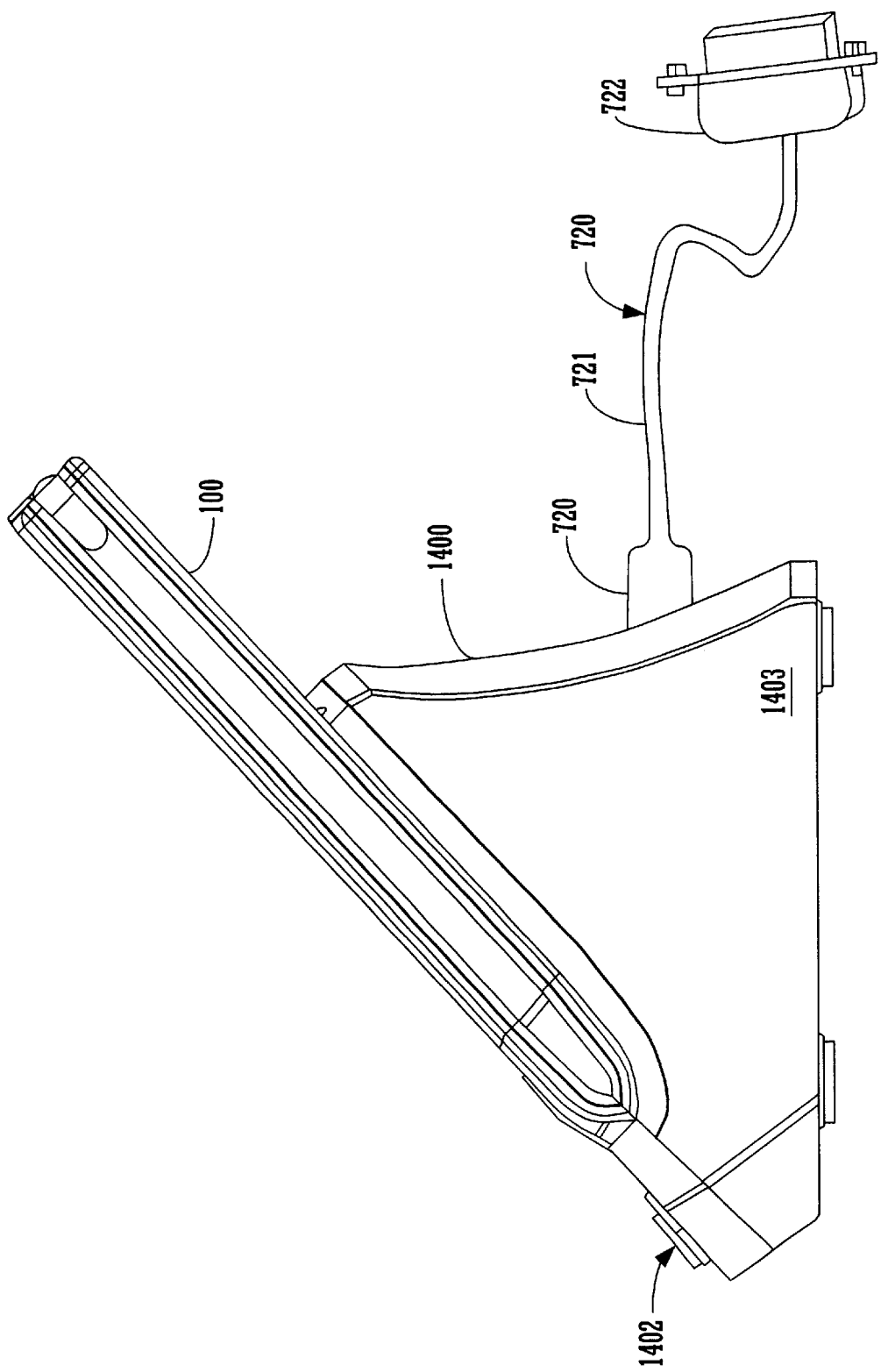

PALMTOP COMPUTER DOCKING SYSTEM

BACKGROUND OF THE INVENTION

1. Field of the Invention

The present invention relates to the field of computer systems. More specifically, the present invention relates to a method and apparatus for coupling information between a palmtop computer and another computing device.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

A docking cradle is typically used for connecting a palmtop computer to another computing device such as a desktop computer. Docking cradles typically include a slot or a surface that receives the palmtop computer such that a connector receptacle on the palmtop computer engages a corresponding connector of the docking cradle. The connector receptacle of the docking cradle is typically permanently attached to the housing of the docking cradle and is connected to an electrical cable that extends through an opening in the rear of the housing. The free end of the electrical cable connects to a serial connector.

Typically, docking cradles are used in desktop environments by connecting the serial connector to a full-size computer. The docking cradle is then placed on the desk where it remains until such time that communication is needed between the palmtop computer and the full-size computer. At that time, the palmtop computer is inserted into the docking cradle. The full-size computer is then operated so as to initiate the required communication. Typically, communication between the palmtop computer and the full-size computer takes the form of "synchronization." That is, specific files on both the full-size computer and the palmtop computer are updated such that both the files on the full-size computer and the palmtop computer include the same data.

Some recent docking cradles include a button that is permanently installed within the housing of the docking cradle. The button electrically connects to the electrical cable and/or to the connector. When a palmtop computer is inserted into a docking cradle that is attached to a full-size computer, the button can be pressed so as to synchronize the palmtop computer to the full-size computer. This makes synchronization easy because the user does not have to operate a software program on the desktop computer to achieve synchronization.

Many owners of palmtop computers also own portable computers such as, for example, portable desktop computers and laptop computers. In an effort to facilitate communication between these portable computers and palmtop computers, serial-to-serial cables have been introduced that are light weight and that are easy to carry. Typically, these serial-to-serial cables include an electrical cable that has a serial connector on each end thereof. One serial cable attaches to the palmtop computer and the other serial connector attaches to the portable computer. Synchronization is typically achieved by operating a software program on the laptop computer.

Docking cradles are typically bulky and heavy, making them unsuitable for mobile computing applications. That is, users that must travel with their portable computer typically do not use docking cradles due to the size and weight of the docking cradle. Instead, these users typically use a serial-to-serial cable for mobile computing.

Many owners of portable computers purchase both a cradle (for desktop use) and a serial-to-serial cable (for use while traveling). The purchase of both a docking cradle and a serial-to-serial cable is expensive and is inefficient.

Thus, what is needed is a method and apparatus for coupling to a palmtop computer that supports both mobile computing and desktop use. Also, a method and apparatus is needed that meets the above need and that is inexpensive. Furthermore, a method and apparatus is needed that meets the above needs and that is compact and light weight enough for mobile computing applications.

SUMMARY OF THE INVENTION

The present invention provides a method and apparatus for coupling to a palmtop computer system that supports both mobile computing and desktop computing uses. Also, the apparatus and method of the present is inexpensive and is compact and lightweight enough for mobile computing applications. The present invention provides these advantages and others not specifically mentioned above but described in the sections to follow.

A method and apparatus as claimed for coupling to a palmtop computer system. In the present embodiment, a palmtop computer docking system is disclosed that includes a cable assembly and a base. The cable assembly includes a cable dock that is connected to a serial connector via an electrical cable. The cable dock includes a connector that mates with a corresponding connector receptacle on a palmtop computer.

In the present embodiment, the cable assembly is adapted to engage the base so as to produce a fully functional docking cradle. In operation, once the cable assembly is engaged with the base, the serial connector is then coupled to the desired computing device (typically either a portable computer or a full-size computer).

In one embodiment, the cable dock includes a button that is disposed on the front surface of the cable dock. Once the cable dock is engaged with a palmtop computer system, the button can be pressed to initiate synchronization between the palmtop computer system and the connected computing device.

Mobile computing is facilitated using only the cable assembly. That is, the cable assembly is removed from the base and is used independently of the base. In operation, the end of the cable assembly that contains the cable dock is connected to a palmtop computer and the opposite end of the cable assembly. is connected to the serial port of a portable computer. The user can then easily synchronize the palmtop computer to the portable computer by pressing the button that is disposed on the cable dock.

The cable assembly of the present invention is small in size and is light in weight. Therefore, the cable assembly of the present invention is more easily carried than prior art docking stations. Thus, the cable assembly of the present invention provides an ideal solution to the needs of mobile computing users.

In the present embodiment, the base is a molded plastic part that does not contain any electronics or any electrical connection mechanisms. Because the base is a molded plastic part that does not contain any electronics or electrical connection mechanisms, the base is inexpensively fabricated.

Because there is no need to purchase both a docking station and a serial-to-serial cable, the apparatus and method of the present invention are less expensive than prior art systems and methods that require the purchase of both a both a docking station and a serial-to-serial cable.

The palmtop computer docking system of the present invention is suitable for both a desktop and mobile computing (e.g. use with a laptop computer). More particularly, connection to a portable computer is readily achieved using the cable assembly while connection to a desktop computer is facilitated by the use of both the base and the cable assembly.

In an alternate embodiment, a palmtop computer docking system is described that includes a cradle main body and a cable assembly. The cable assembly connects to the rear of the cradle main body to form a fully functional docking cradle. Mobile computing is easily achieved using the cable assembly alone while communication with a non-mobile computer is achieved using both the cradle main body and the cable assembly.

The present invention provides a method and apparatus for coupling to a palmtop computer that supports both mobile computing and desktop use. Also, the cable assembly of the present invention is compact and lightweight enough for mobile computing applications. In addition, the method and apparatus of the present invention are less expensive than prior art systems and methods.

These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

FIG. 17 shows a side view of a palmtop computing system inserted into a palmtop computer docking system that includes a docking cradle main body and a cable assembly in accordance with an embodiment of the present invention.

DETAILED DESCRIPTION OF THE INVENTION

In the following detailed description of the present invention, a method and apparatus for connecting to a palmtop computer system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "calculating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
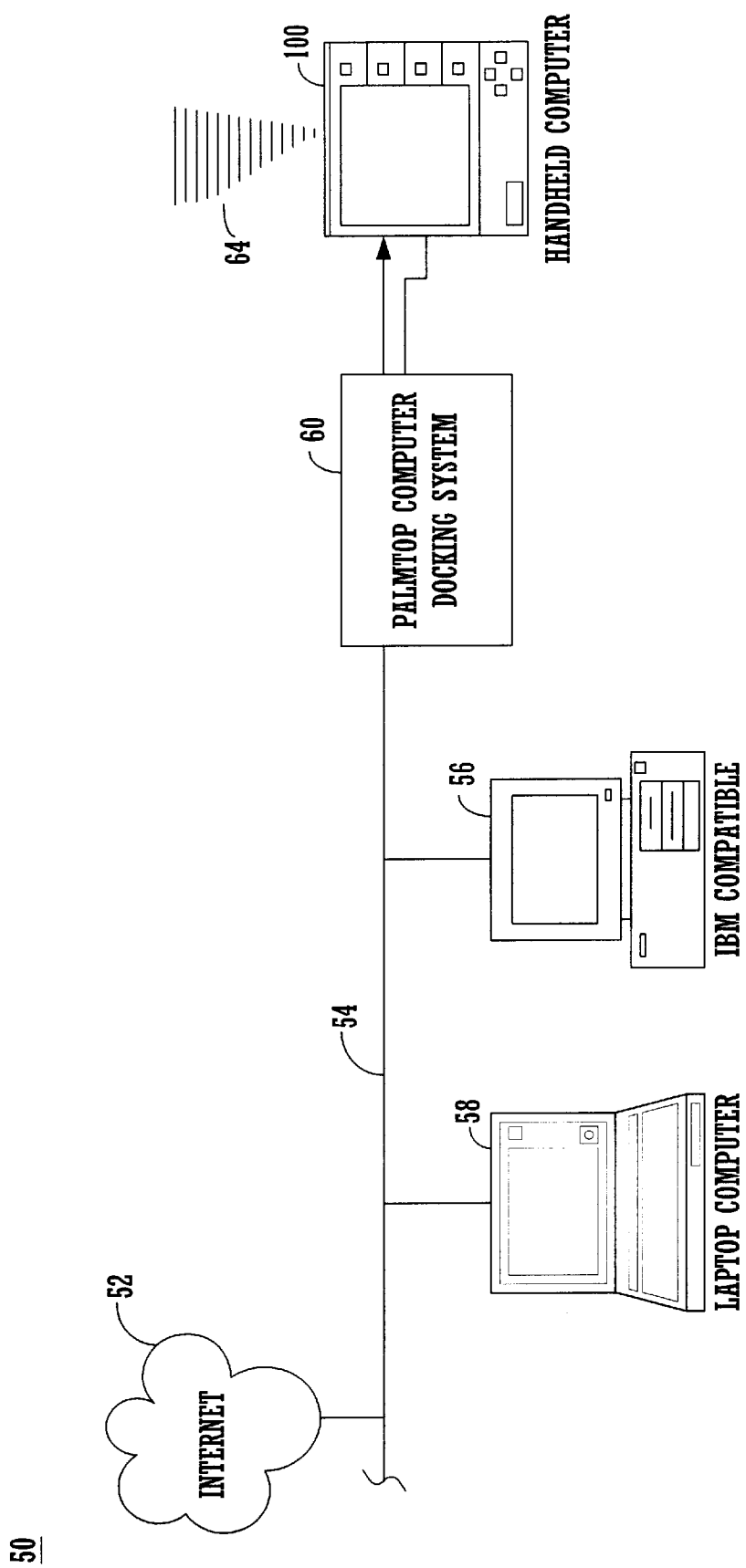
FIG. 1 is system illustration of a palmtop computer system connected to other computer systems and the Internet via a palmtop computer docking system in accordance with the present invention.

Coupling to a Palmtop Computer System in Accordance with the Present Invention FIG. 1 illustrates a system 50 that includes a palmtop computer docking system 60. System 50 can be used in conjunction with the method for coupling to a palmtop computer system of the present invention. System 50 includes a computer system 56 that can either be a desktop unit as shown, or, alternatively, can be a portable computer system such as laptop computer system 58. Computer system 58 and computer system 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Bus 54 is also coupled to palmtop computer docking system 60 for receiving and initiating communication with a palmtop ("palm-sized") portable computer system 100 of the present invention. Palmtop computer docking system 60 provides an electrical and mechanical communication interface between bus 54 (and anything coupled to bus 54) and computer system 100 for two-way communications. Computer system 100 also contains a wireless infrared communication mechanism 64 for sending and receiving information from other devices.

Figure 2:
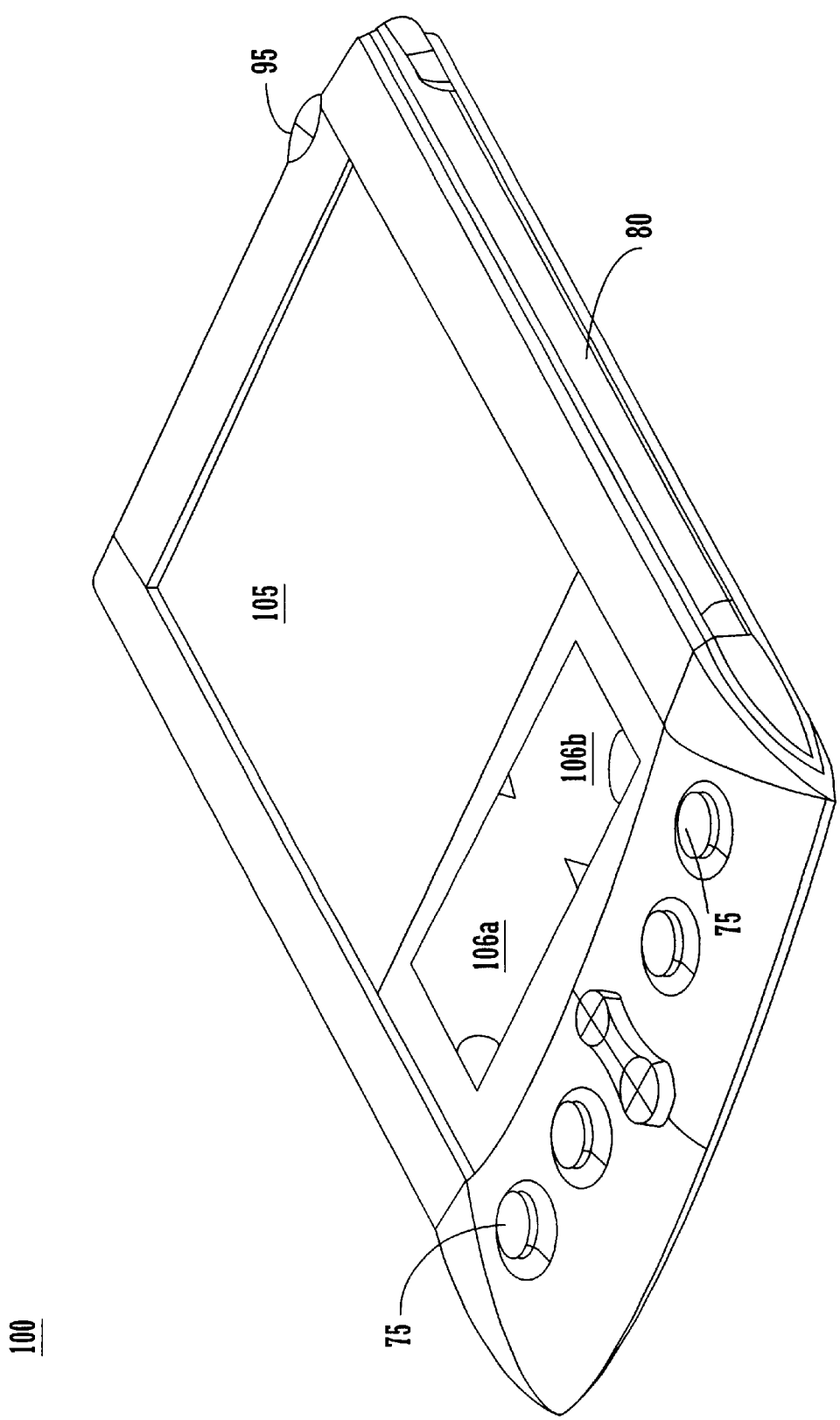
FIG. 2 is a front perspective view of a palmtop computer system that can be coupled to other computing systems using the palmtop computer docking system of the present invention.

FIG. 2 is a perspective illustration of an exemplary palmtop computer system 100. Palmtop computer system 100 contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. Palmtop computing system 100 also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alpha characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
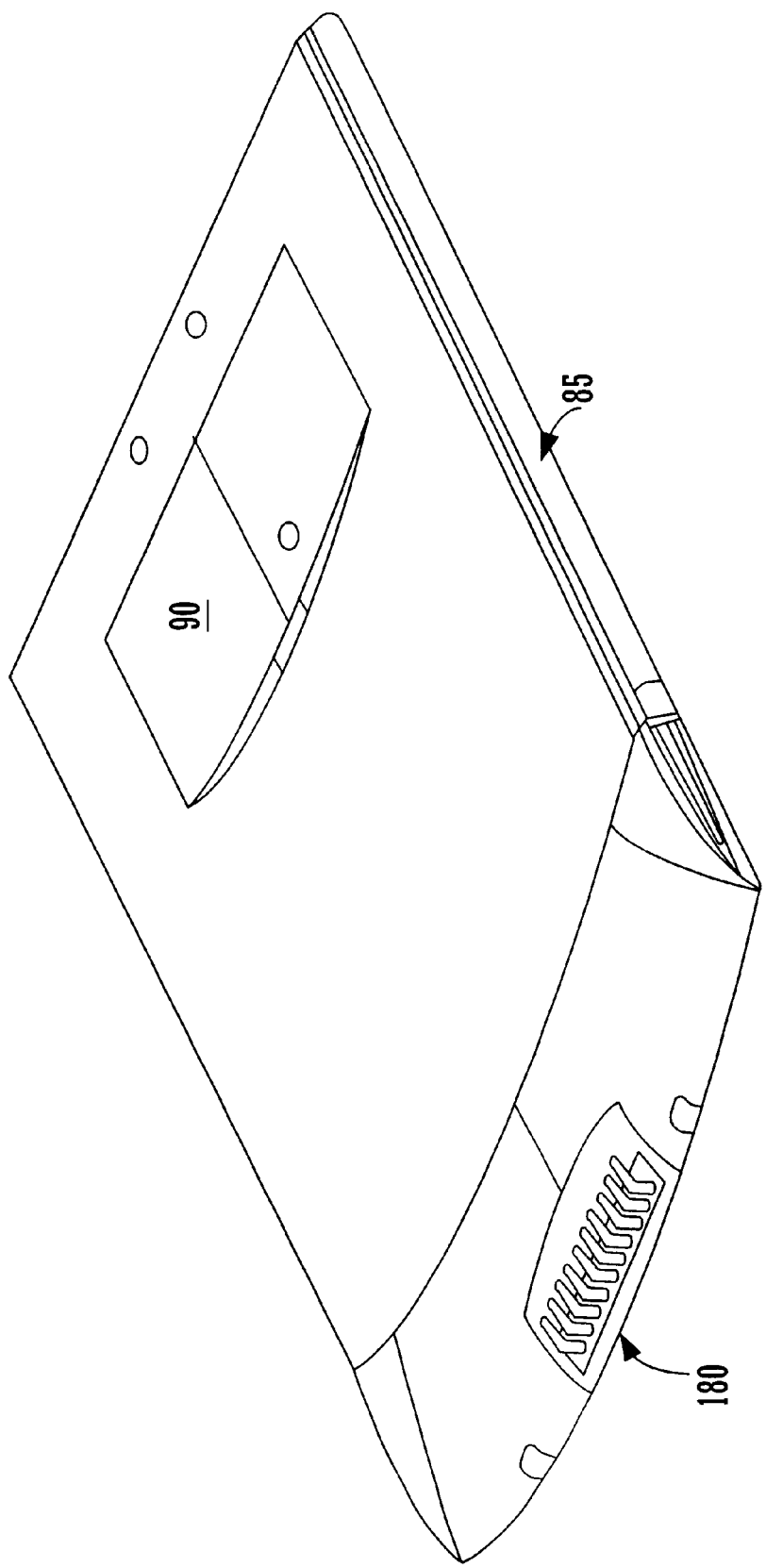
FIG. 3 is a rear perspective view of the palmtop computer system of FIG. 2.

FIG. 3 illustrates the bottom side of palmtop computer system 100. An optional extendible antenna 85 is shown and also a battery storage compartment door 90 is shown. A communication interface 108 is also shown. In one embodiment of the present invention, the communication interface 108 is a wipe-style serial connector. Alternatively, communication interface 108 could be of any of a number of well known types of communication devices and could use and of a number of standards and protocols such as, for example, parallel, SCSI, Firewire (IEEE 1394), Ethernet, etc.

Figure 4:
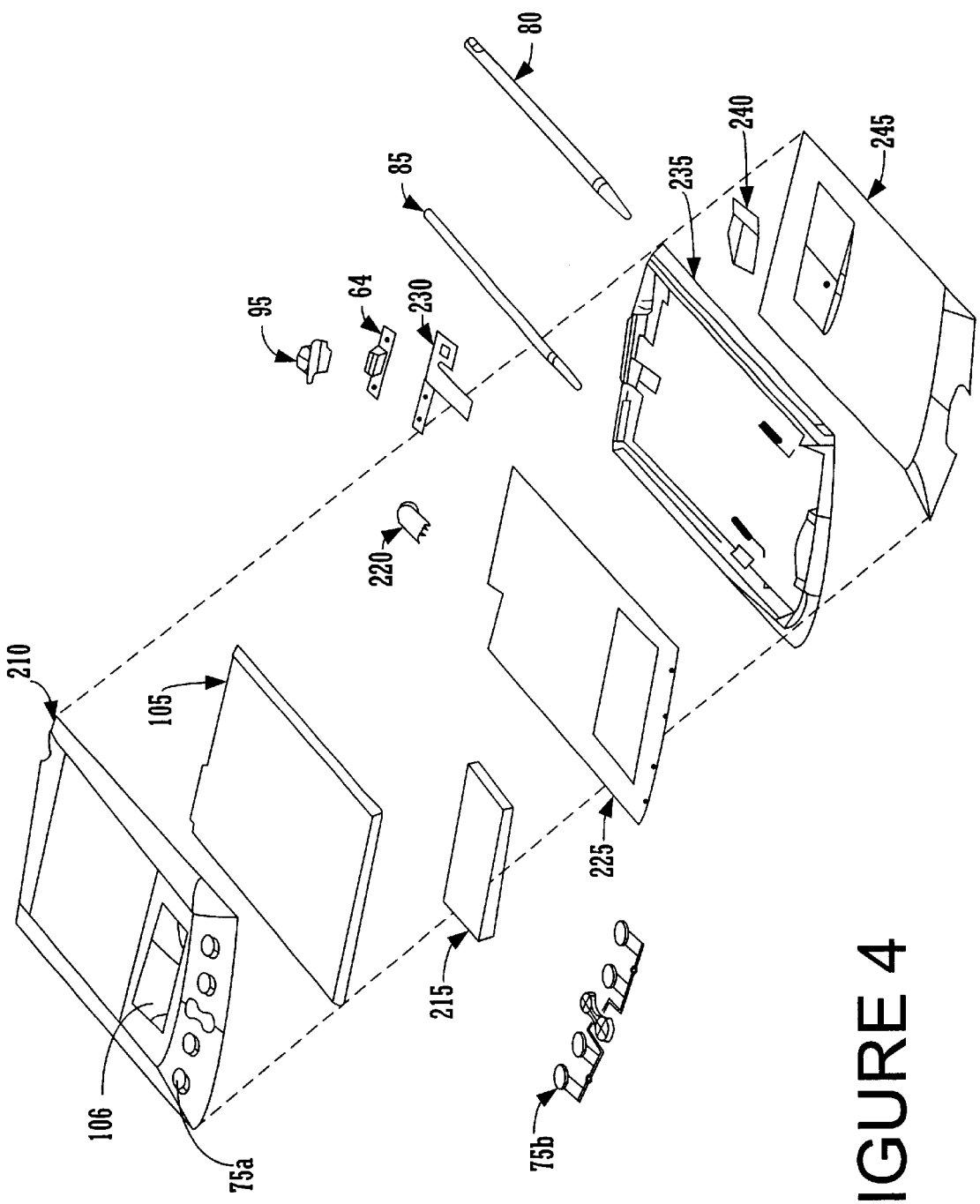
FIG. 4 is an exploded view of the components of the palmtop computer system of FIG. 2.

FIG. 4 is an exploded view of palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power and can be rechargeable. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 4. The receiver/transmitter device 240 is coupled to the antenna 85 and also coupled to communicate with the PC board 225. In one implementation the Mobitex wireless communication system is used to provide two-way communication between system 100 and other networked computers and/or the Internet via a proxy server.

Figure 5:
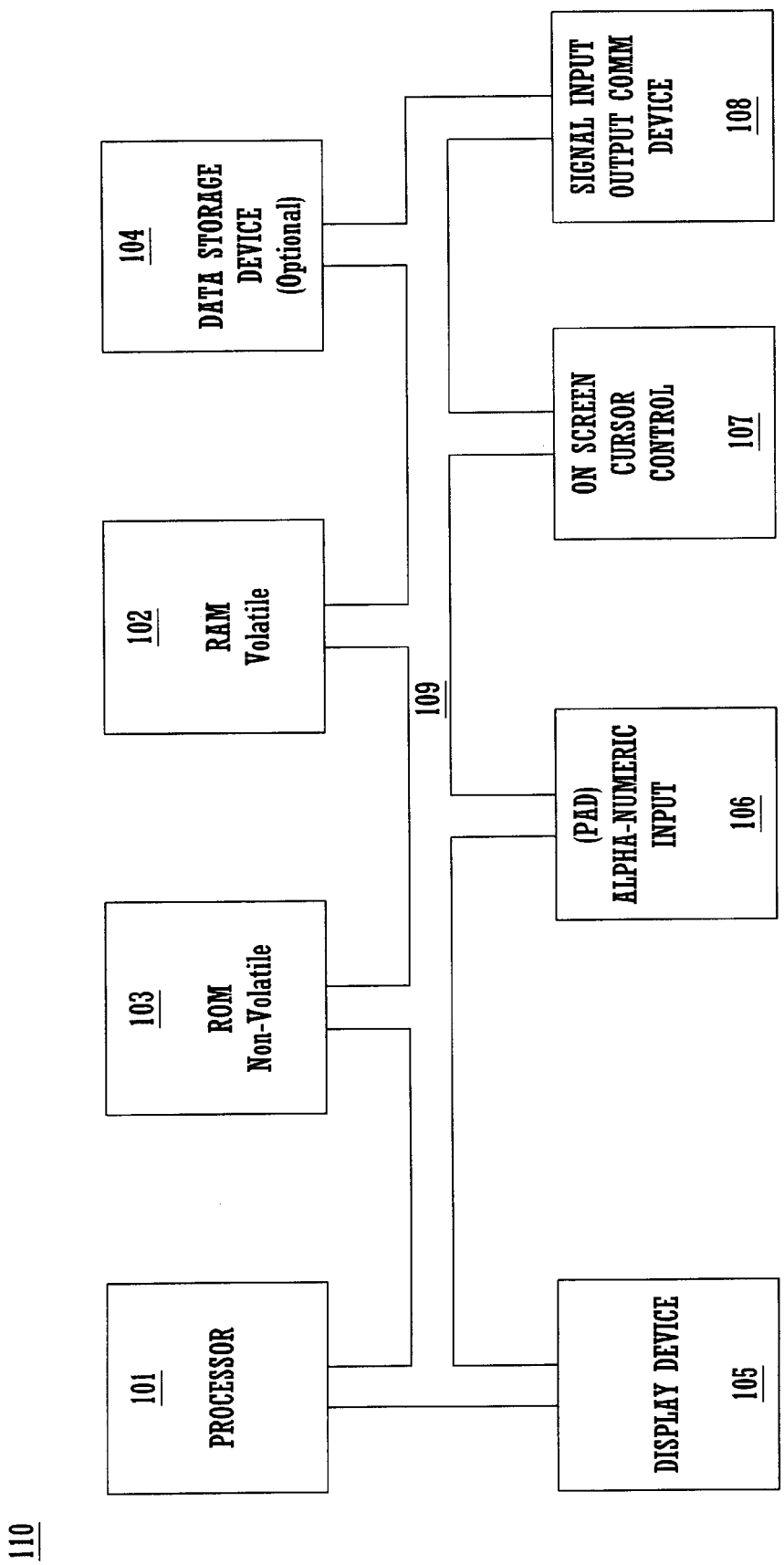
FIG. 5 is a perspective view of an exemplary computer system.

FIG. 5 illustrates circuitry of computer system 110, some of which can be implemented on PC board 225. Computer system 110 includes an address/data bus 109 for communicating information, a central processor 101 coupled with the bus for processing information and instructions, a volatile memory 102 (e.g., random access memory RAM) coupled with the bus 109 for storing information and instructions for the central processor 101 and a non-volatile memory 103 (e.g., read only memory ROM) coupled with the bus 109 for storing static information and instructions for the processor 101. Computer system 110 also includes an optional data storage device 104 (e.g., memory stick) coupled with the bus 109 for storing information and instructions. Device 104 can be removable. As described above, system 110 also contains a display device 105 coupled to the bus 109 for displaying information to the computer user. PC board 225 can contain the processor 101, the bus 109, the ROM 103 and the RAM 102.

Also included in computer system 110 of FIG. 5 is an optional alphanumeric input device 106 that in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel ORT) or other display device suitable for creating graphic images and alphanumeric characters recognizable to the user. In the preferred embodiment, display 105 is a flat panel display.

Signal input output communication device 108, also coupled to bus 109, can be a communication device for communicating with palmtop computer docking system 60 of the present invention. In one embodiment, communication device 108 is a serial port adapted to couple communications to palmtop computer docking system 60 of the present invention.

Figure 6:
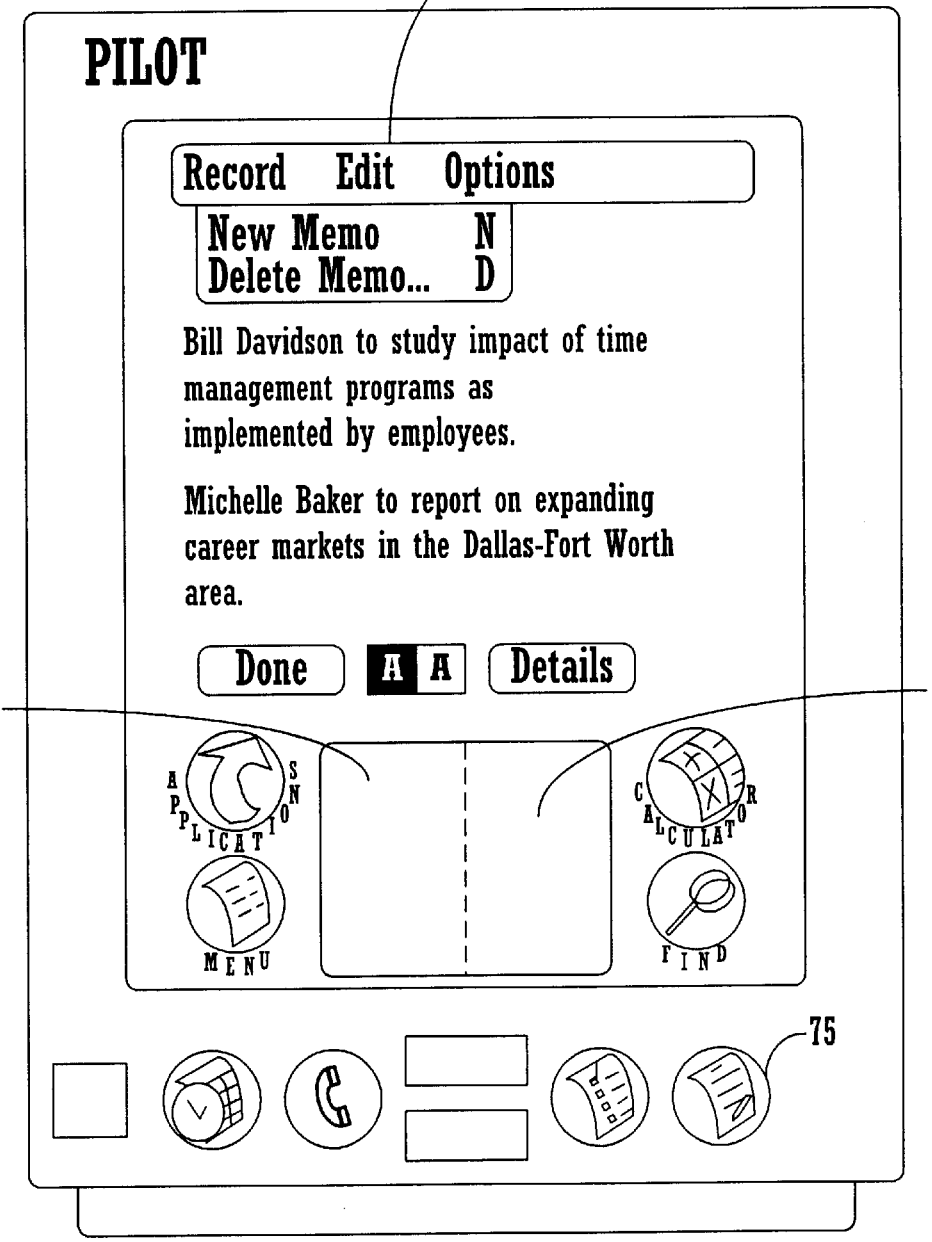
FIG. 6 is a logical block diagram showing a display of a palmtop computer system.

FIG. 6 is a front view of palmtop computer system 100 with a menu bar 305 open displaying a pull down window. Also shown are two regions of digitizer 106a and 106b. Region 106a is for receiving user stroke data for alphabet characters, and typically not numeric characters, and region 106b is a for receiving user stroke data for numeric data, and typically not for alphabetic characters. Physical buttons 75 are also shown.

FIGS. 7–13 show an embodiment in which palmtop computer docking system 60a includes cable assembly 701 that is adapted to couple a computer system (e.g. palmtop computer system 100 of FIGS. 1–6 and computer system 110 of FIG. 5) to other computing systems and/or devices. Palmtop computer docking system 60a also includes base 702 that receives cable assembly 701 so as to produce a fully functional cradle. Palmtop computer docking system 60a enables communication between palmtop computer 100 of FIGS. 1–6 and other electronic devices such as, for example, laptop computer 58 and desktop computer 56 of FIG. 1.

Figure 8:
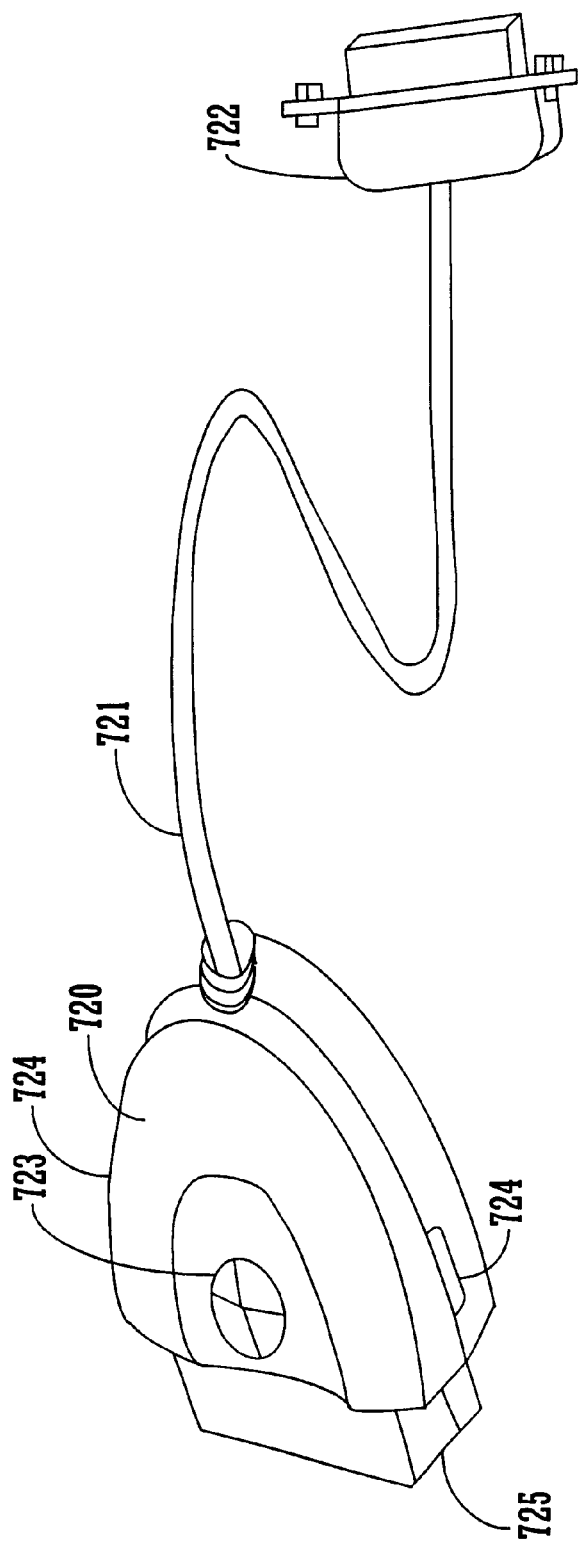
FIG. 8 is a front perspective view of a cable assembly in accordance with an embodiment of the present invention.

Referring now to FIG. 8, cable assembly 701 includes cable dock 720 that is electrically coupled to connection mechanism 722 via electrical cable 721. In the present embodiment, cable dock 720 includes a palmtop computer connection mechanism 725 that is a mechanical and electrical interface for interfacing with palmtop computer system 100 shown in FIGS. 1–6. In the present embodiment, palmtop computer connection mechanism 725 is a connector receptacle adapted to couple to the wipe-style connector pins of communications interface 108 shown in FIG. 3. However, palmtop connection mechanism 725 can include any of a number of other types of connectors and/or connector receptacles that allow for coupling of cable assembly 701 to a palmtop computer system 100 for instance.

Continuing with FIG. 8, connection mechanism 722 is adapted to electrically couple cable assembly 701 to other electrical devices such as, for example, laptop computer 58 and desktop computer 56 of FIG. 1. In the present embodiment, connection mechanism 722 includes a mechanical and electrical interface (e.g., a serial connector) that is adapted to couple to a serial port. However, connection mechanism 722 can also include any of a number of other types of connectors and/or connector receptacles that allow for coupling of cable assembly 701 to other computer systems and/or electronic devices.

Still referring to FIG. 8, cable dock 720 includes detents 714 that are located on opposite sides of cable dock 720. Cable dock 720 also includes button 723 that is disposed on the front surface of cable dock 720. Once cable dock 720 is engaged with a palmtop computer system 100, button 723 can be pressed to initiate two-way communication between palmtop computer system 100 and other computer systems coupled to connection mechanism 722.

Cable assembly 701 is particularly advantageously used for coupling to a computer that is a portable computer (e.g. laptop computer 58 of FIG. 1). That is, cable assembly 701 is used independently of base 702 to couple to, for example, laptop computer 58. Cable assembly 701 enables mobile users to easily synchronize data between palmtop computer system 100 and laptop computer 58 by pressing button 723. Cable assembly 701 is smaller in size and lighter than conventional docking cradles, and therefore, is more easily carried. Thus, cable assembly 701, used independently of base 702, facilitates mobile computing.

Figure 9:
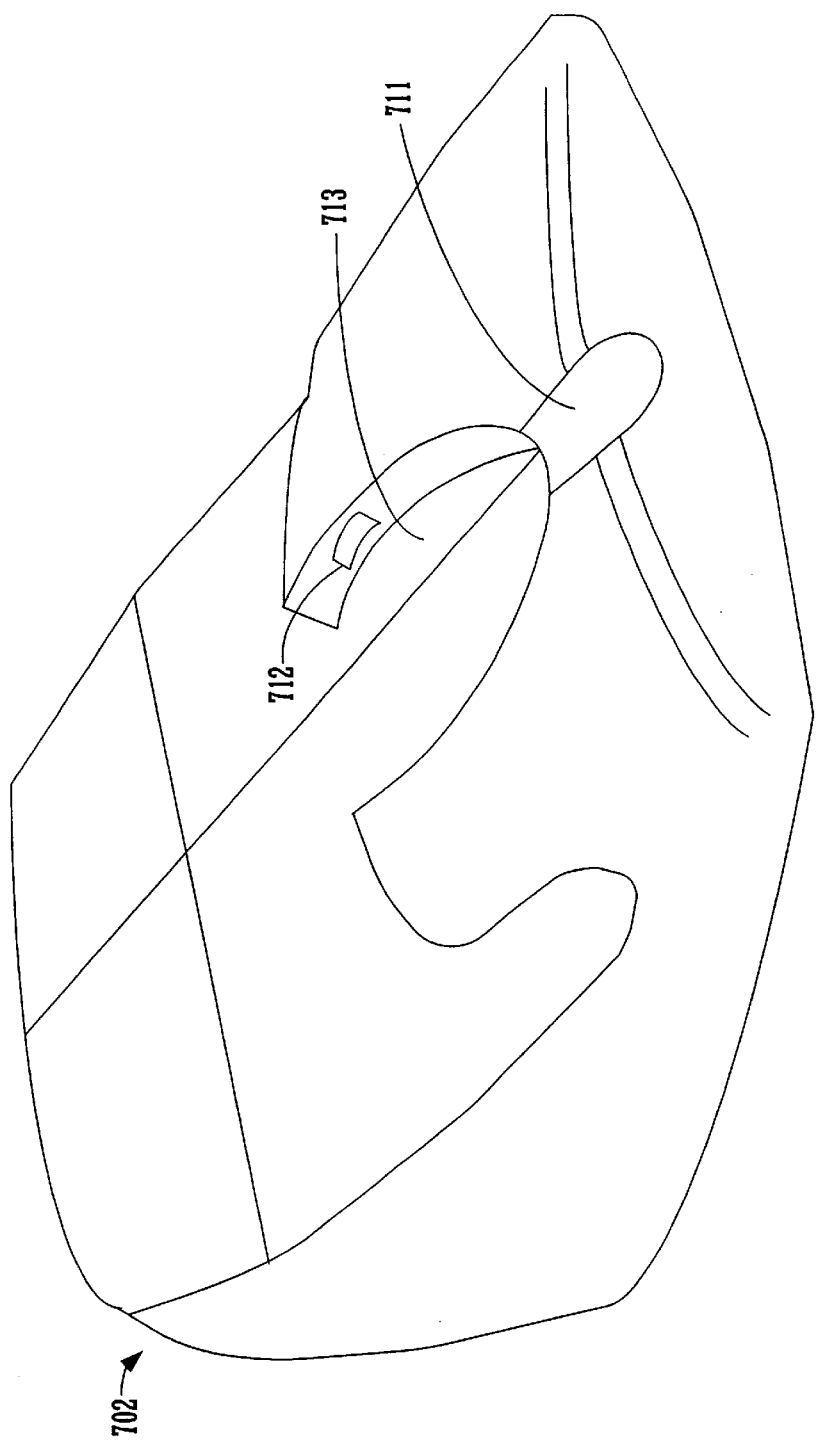
FIG. 9 illustrates a front perspective view of a base in accordance with an embodiment of the present invention.

FIG. 9 shows base 702 to include cable dock receiving region 713 that is adapted to receive cable dock 720. Base 702 also includes cable receiving region 711 that forms a channel adapted to receive cable 721. Base 702 also includes openings 712 that are disposed on opposite sides of cable dock receiving region 713. In the present embodiment, base 702 is a molded plastic part that does not contain any electronics or electrical connection mechanisms. Because base 702 is a molded plastic part that does not contain any electronics or electrical connection mechanisms, base 702 is inexpensively fabricated.

Figure 7:
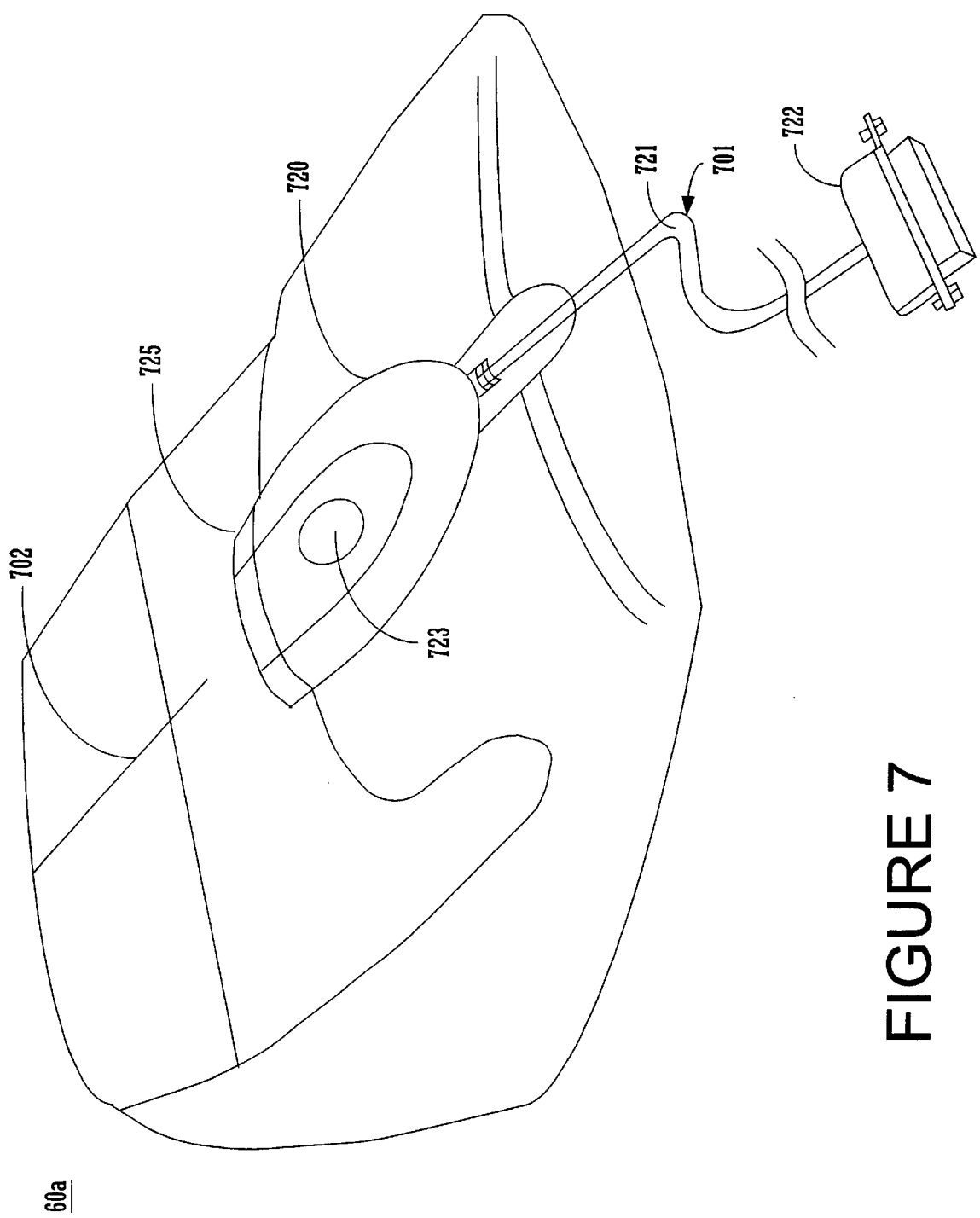
FIG. 7 is a front perspective view of a palmtop computer docking system that includes a cable dock that is engaged with a base in accordance with an embodiment of the present invention.
Figure 10:
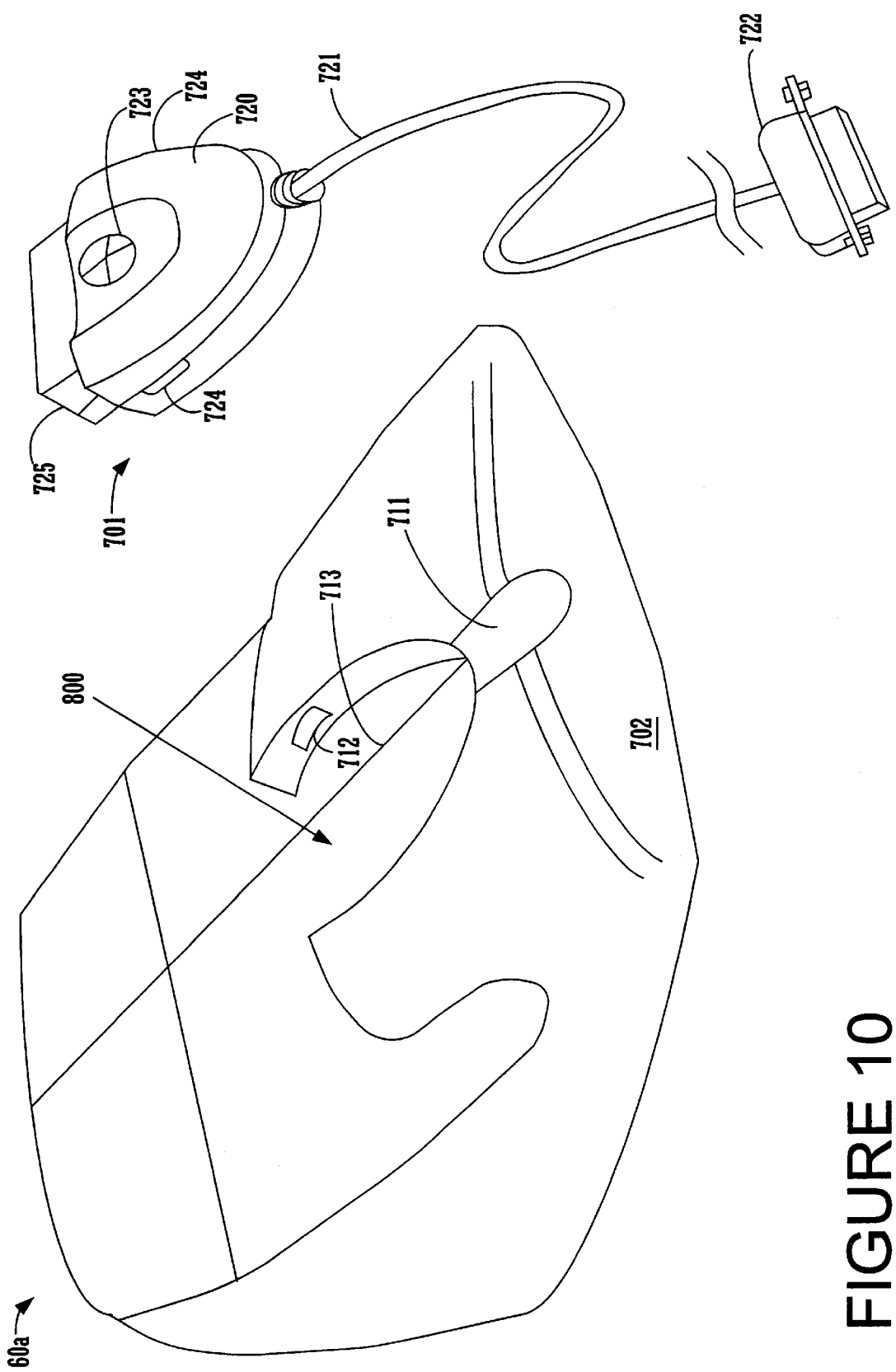
FIG. 10 illustrates the insertion of a cable dock into a base in accordance with an embodiment of the present invention.

Referring now to FIG. 10, cable assembly 701 is adapted to be inserted into base 702 as shown by arrow 800. More particularly, cable dock 720 can be inserted into opening 713 such that detents 724 engage openings 712 so as to engage cable dock 720 with base 702. Upon engagement of cable dock 720 with base 702, the engagement of detents 724 with openings 712 holds cable dock 720 securely to base 702. Engagement of cable dock 720 with base 702 forms a complete cradle as is shown in FIG. 7.

Figure 11:
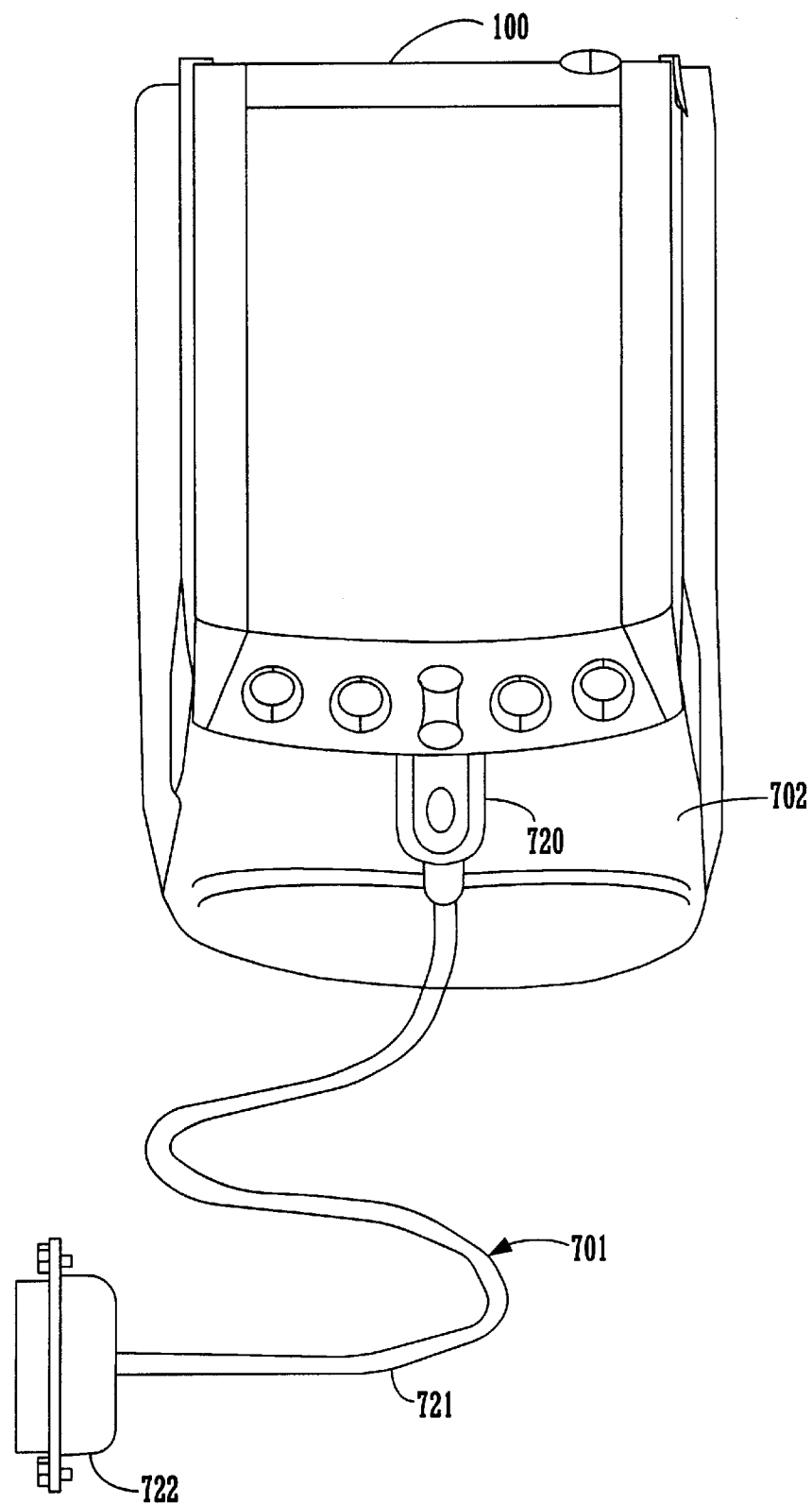
FIG. 11 illustrates a front view of a palmtop computer system that is inserted into a palmtop computer docking system that includes a cable dock that is engaged with a base in accordance with an embodiment of the present invention.
Figure 12:
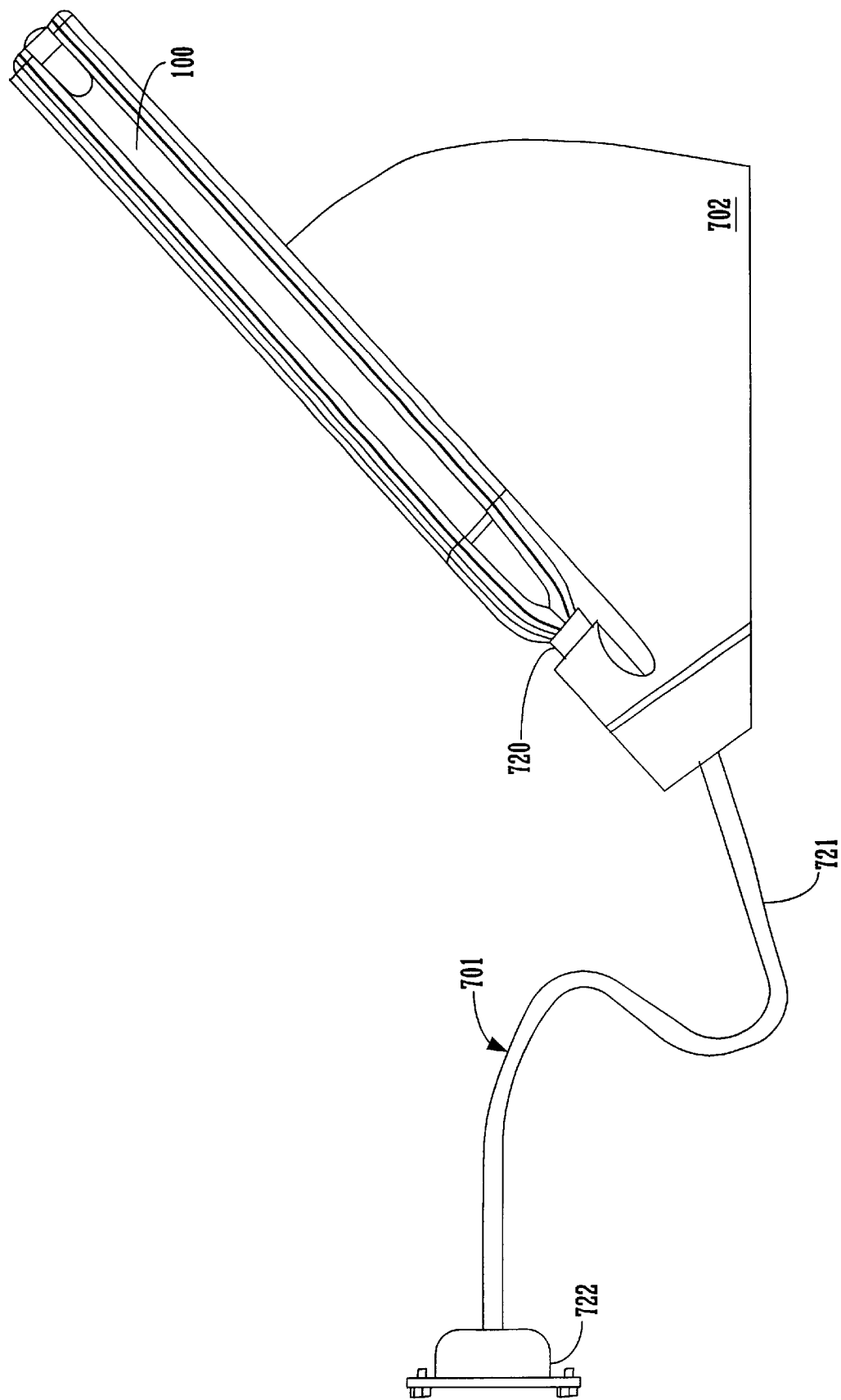
FIG. 12 illustrates a side view of a palmtop computer system that is inserted into a palmtop computer docking system that includes a cable dock that is engaged with a base in accordance with an embodiment of the present invention.

Referring now to FIGS. 11–12, a palmtop computer system 100 is shown to be disposed in the docking cradle formed by the engagement of cable dock 720 with base 702. More particularly, palmtop computer system 100 is shown to be coupled to cable dock 720. This allows for electrically coupling and/or synchronizing palmtop computer 100 with other computing systems and/or electrical devices that are coupled to connection mechanism 722.

The palmtop computer docking system 60a of the present invention is suitable for both a desktop environment (e.g., use with full-size computer 56 of FIG. 1) and mobile computing (e.g., laptop computer 58 of FIG. 1). More particularly, connection to a portable computer is easily achieved using cable assembly 701 while connection to a desktop computer is facilitated by the use of both base 702 and cable assembly 701.

Figure 13:
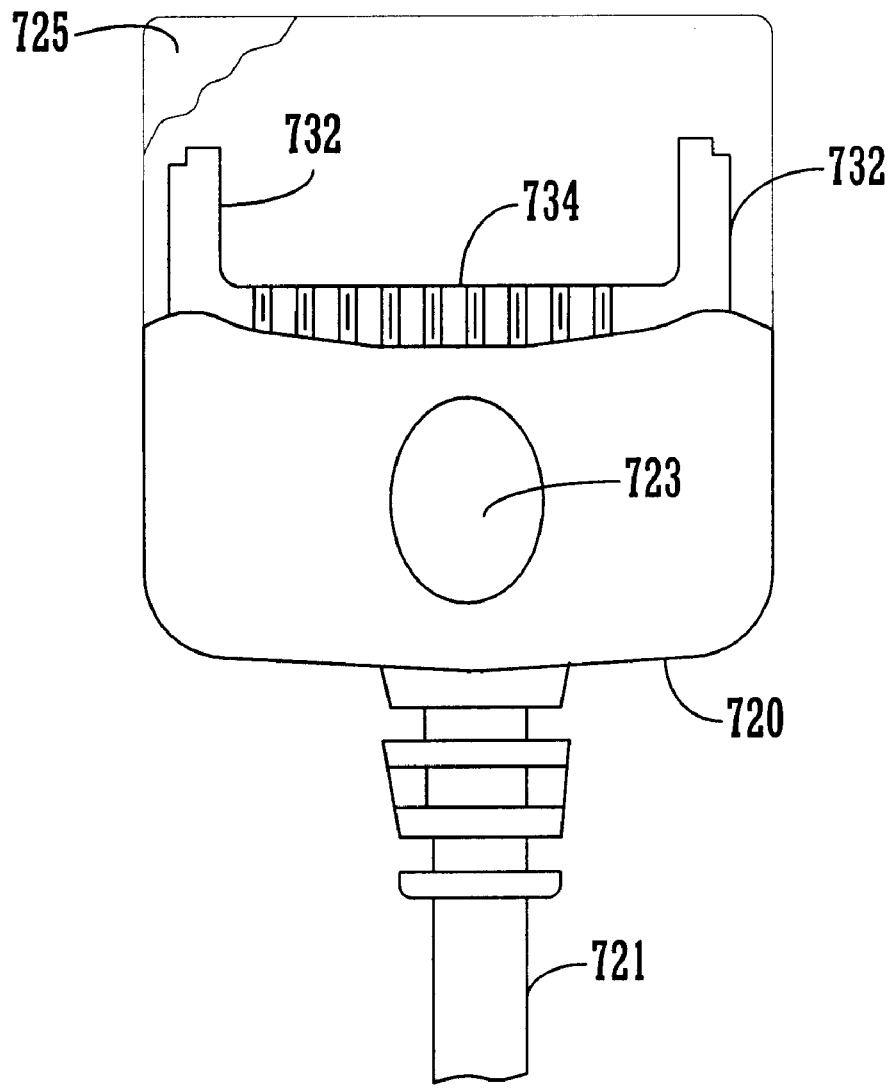
FIG. 13 illustrates a front cut-away view of a cable dock in accordance with an embodiment of the present invention.

Referring now to FIG. 13, an embodiment of cable dock 720 is shown that includes a connector receptacle 725 that is adapted to couple to a wipe-style serial connector (e.g. wipe-style serial connector 108 of FIG. 3). In this embodiment, connector receptacle 725 includes engaging projections 732 for mechanically engaging connector receptacle 725 with a corresponding connector of a palmtop computer system and electrical contacts 734 for electrically coupling connector receptacle 725 to a corresponding connector of a palmtop computer system.

FIGS. 14–17 show a palmtop computer docking system 60b that includes a cradle main body 1400 and a cable assembly 701. In one embodiment of the present invention, cable assembly 701 is identical to cable assembly 701 of FIGS. 7–13. Palmtop computer docking system 60b is adapted to couple a palmtop computer system (e.g. palmtop computer system 100 of FIGS. 1–6) to other computer systems and/or electrical devices.

Figure 14:
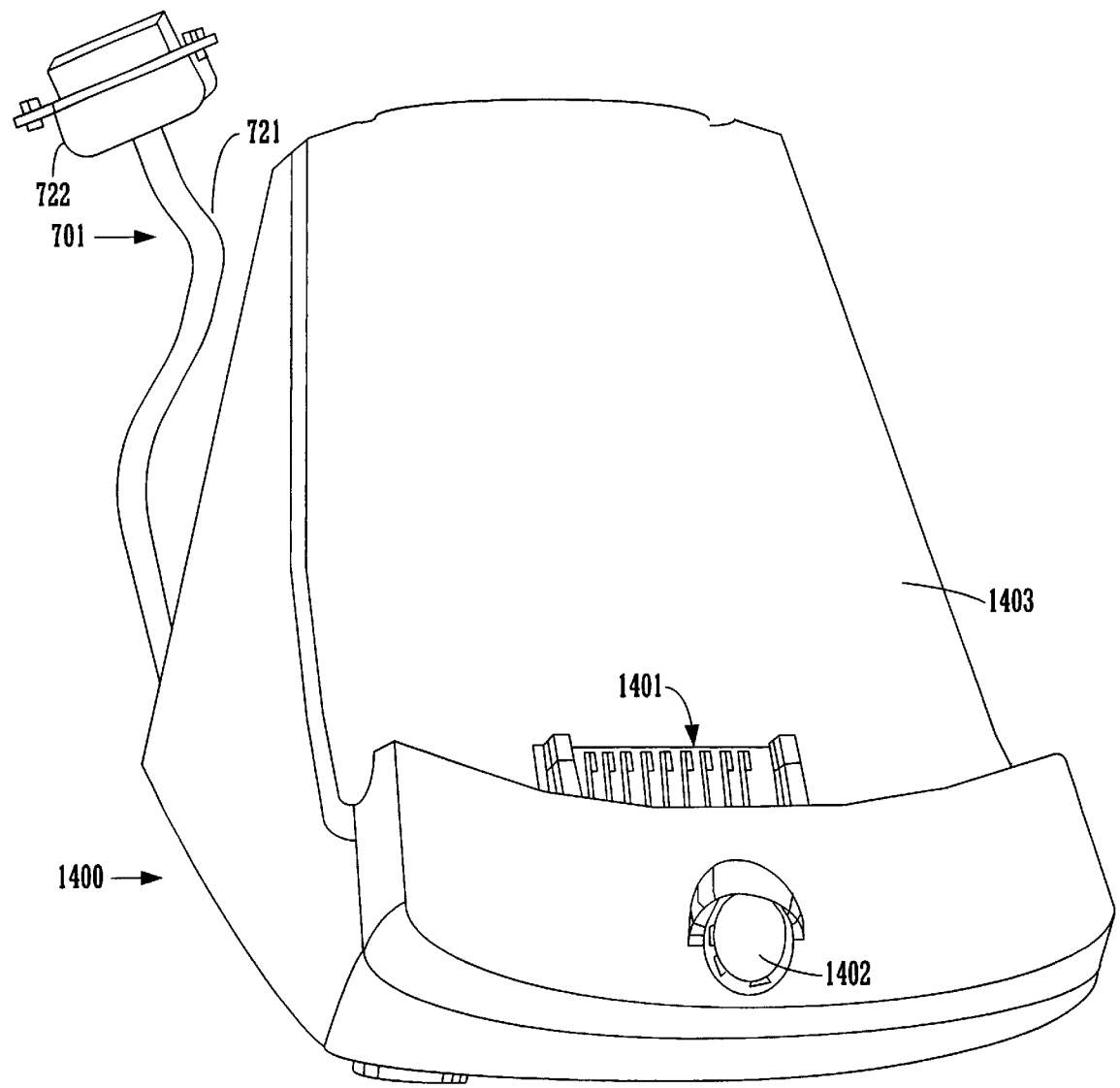
FIG. 14 illustrates a front perspective view of a palmtop computer docking system that includes a docking cradle main body and a cable assembly in accordance with an embodiment of the present invention.

Referring now to FIG. 14, cradle main body 1400 includes housing 1403 within which button 1402 is disposed. In the present embodiment, housing 1403 is a molded plastic. However, any of a number of other materials could be used to form housing 1403. Connection mechanism 1401 is secured within housing 1403. In the present embodiment, connection mechanism 1401 is a connector receptacle that is adapted to couple to a corresponding connection mechanism (e.g. wipe-style serial connector 108 of FIG. 3) on palmtop computer 100.

Figure 15:
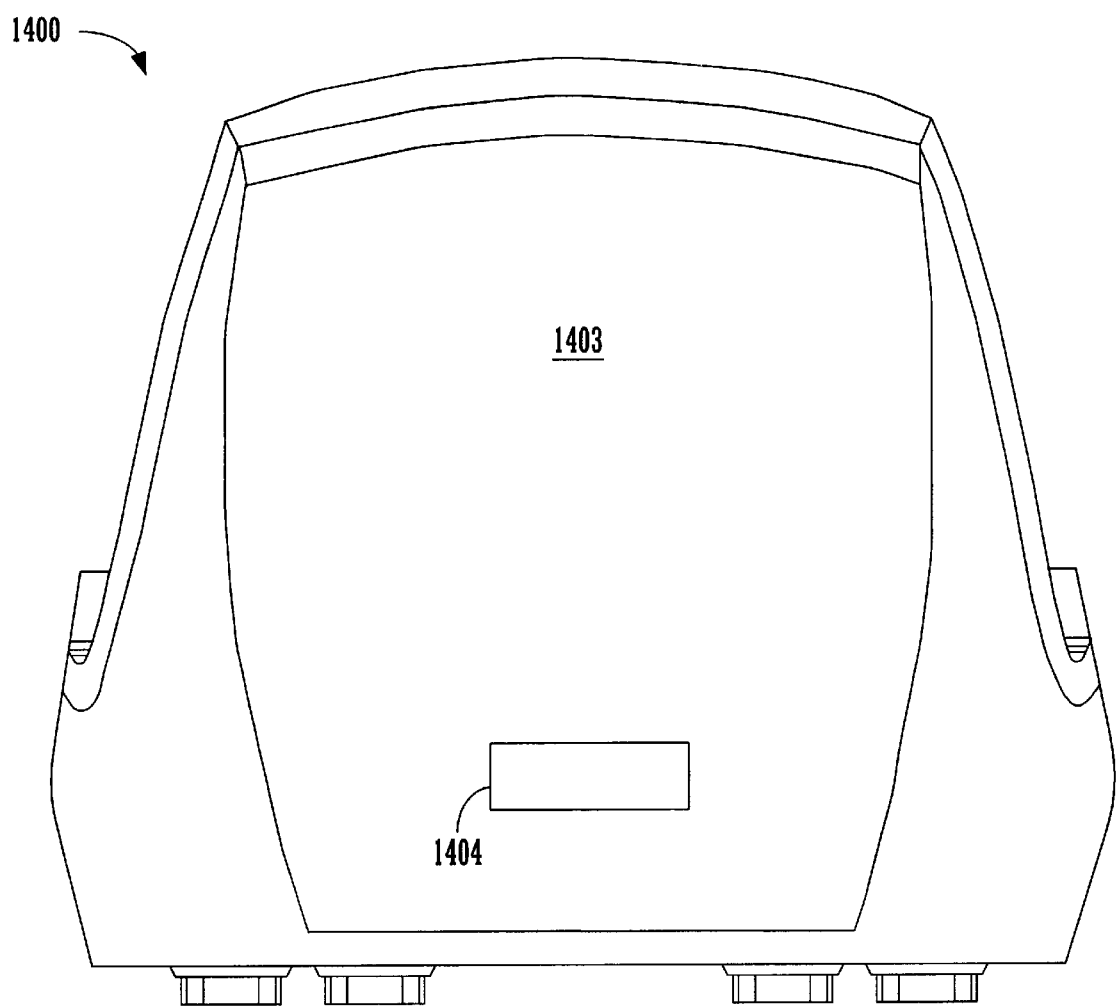
FIG. 15 illustrates a rear view of the docking cradle main body of FIG. 14 once the cable assembly is removed therefrom in accordance with one embodiment of the present invention.
Figure 16:
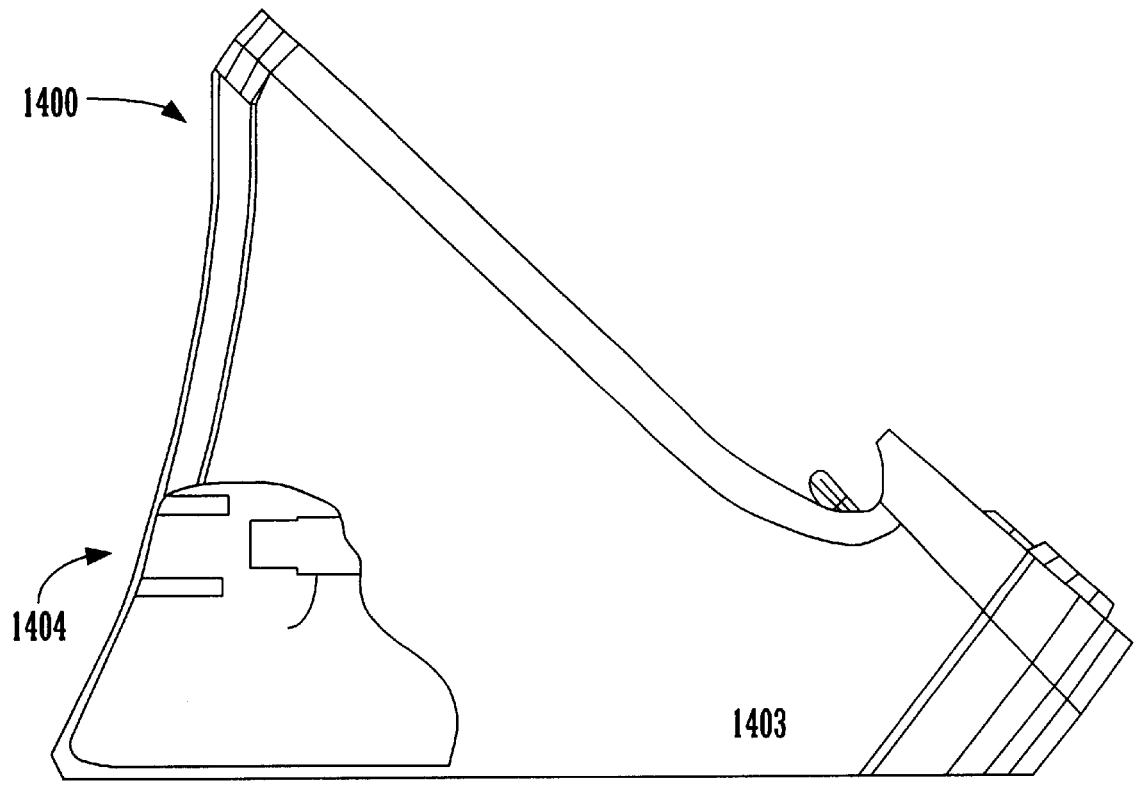
FIG. 16 illustrates a cut-away side view of the docking cradle of FIG. 14 once the cable assembly is removed therefrom in accordance with one embodiment of the present invention.

FIGS. 15–16 show cradle main body 1400 with cable assembly 701 removed therefrom. In the present embodiment, opening 1404 extends through the back surface of housing 1403. Connection mechanism 1405 is disposed inside of housing 1403 proximate to opening 1404. Connection mechanism 1405 is electrically coupled to connection mechanism 1401 and to button 1402. In the present embodiment, connection mechanism 1405 is a wipe-style electrical connector that is adapted to mate with connector receptacle 725 of FIG. 13.

When cable assembly 701 is coupled to cradle main body 1400, a complete docking cradle is formed. The resulting docking cradle is well suited for desktop computing such as, for example, making a connection between the palmtop computing device 100 and a full size computer.

FIG. 17 shows a palmtop computer 100 disposed within the cable dock formed by coupling cable assembly 701 to main body 1400. When cable dock 720 is inserted into opening 1404 of FIG. 16, cable dock 720 electrically and mechanically connected to cradle main body 1400. In the present embodiment, button 1402 can be pressed to achieve synchronization with palmtop computer 100. Thereby, computing devices that are coupled to connection mechanism 722 are electrically coupled to palmtop computer system 100.

Cable assembly 701 is used independently of cradle main body 1400 for coupling to a computer that is a portable computer (e.g. laptop computer 58 of FIG. 1). Cable assembly 701 enables mobile users to easily synchronize data between palmtop computer system 100 and laptop computer 58 by pressing button 723. Cable assembly 701 is smaller in size and lighter than conventional docking cradles, and therefore, is more easily carried. Thus, cable assembly 701, used independently of cradle main body 1400, facilitates mobile computing.

The palmtop computer docking system 60*b* of the present invention is suitable for both a desktop environment (e.g. use with full-size computer 56 of FIG. 1) and mobile computing (e.g. laptop computer 58 of FIG. 1). More particularly, connection to a portable computer is easily achieved using cable assembly 701 while connection to a desktop computer is facilitated by the use of both cradle main body 1400 and cable assembly 701.

Though the computer docking system of FIGS. 1–17 is described as a docking system for a palmtop computer, the docking system of the present invention is well adapted for use with computer system 110 of FIG. 5. Thus, the docking system of the present invention is well suited for coupling communication to all types of portable computers including Personal Digital Assistants (PDA's), laptop computers, etc.

While the present invention has been described in particular embodiments, it should be appreciated that the present invention should not be construed as limited by such embodiments, but rather construed according to the below claims.

What is claimed is:

1. A docking system for a portable computer system comprising:

a cable assembly comprising a cable dock, an electrical cable, and a first connection mechanism, said first connection mechanism coupled to one end of said electrical cable and said cable dock coupled to the opposite end of said electrical cable, said cable dock comprising a second connection mechanism disposed therein for coupling to a portable computer system, said cable dock further comprising a button operable for synchronizing data within said portable computer system;

a base, said base including provision for receiving said cable assembly such that said cable dock detachably engages said base, said second connection mechanism for engaging a portable computer system upon the insertion of a portable computer system into said base for electrically coupling to said portable computer system; and wherein said cable assembly is detachable from said base such that said cable assembly can be used independently of said base.

2. A docking system for a portable computer system as described in claim 1 wherein said base does not include any electrical components for coupling to a computer.

3. A docking system for a portable computer system as described in claim 1 wherein said base does not include an electrical connector.

4. A docking system for a portable computer system as described in claim 1 wherein said base does not include any electrical cabling.

5. A docking system for a portable computer system as described in claim 1 wherein said second connection mechanism comprises a connector that couples to a palmtop computer system having a wipe-style serial connector.

6. A docking system for a portable computer system as described in claim 1 wherein said first connection mechanism comprises a serial connector for coupling to a serial port of a computing device.

7. A docking system for a portable computer system as described in claim 1 wherein said cable dock comprises a detent disposed thereon, said detent for engaging a corresponding slot within said base.

8. A method for coupling to a portable computer system comprising the steps of:

a) providing a cable assembly including an electrical cable, a cable dock that includes a button, and a first connection mechanism, said cable dock coupled to one end of said electrical cable and said first connection mechanism coupled to the opposite end of said electrical cable;

b) providing a base, said base including provision for receiving said cable assembly;

c) coupling said cable assembly to said base so as to form a docking cradle for coupling to a portable computer system;

d) coupling said first connection mechanism to a computing device;

e) inserting a portable computer system into said base such that said portable computer system is electrically coupled to said cable dock, thereby electrically coupling said portable computer system to said computing device;

f) pressing said button so as to synchronize data between said portable computer system and said computing device; and wherein said cable assembly is detachable from said base such that said cable assembly can be used independently of said base.

9. A method as described in claim 8 wherein said base does not include an electrical connector.

10. A method as described in claim 9 wherein said cable dock includes a connector receptacle that is adapted to couple to a palmtop computer system having a wipe-style serial connector.

11. A method as described in claim 8 wherein said first connection mechanism includes a serial connector and wherein step d) further comprises inserting said serial connector into a corresponding connector receptacle of said computing device.

12. A cable assembly comprising:

an electrical cable;

a first connection mechanism for coupling said cable assembly to a remote computer, said first connection mechanism coupled to one end of said electrical cable;

a second connection mechanism for coupling said cable assembly to a portable computer system, said second connection mechanism coupled to the opposite end of said electrical cable and adapted to detachably engage a base for coupling to said portable computer system when said portable computer system is disposed in said base, said second connection mechanism detachable from said base such that said cable assembly can be used independently of said base; and a button coupled to said second connection mechanism, said button operable to initiate synchronization of data with said portable computer system when said portable computer system is coupled to said second connection mechanism.

* * * * *